July 24, 1962  C. I. CEDERHOLM  3,045,788
BAYONET REEL
Filed Feb. 10, 1959
Fig. 1.
Fig. 2.
Fig. 3.
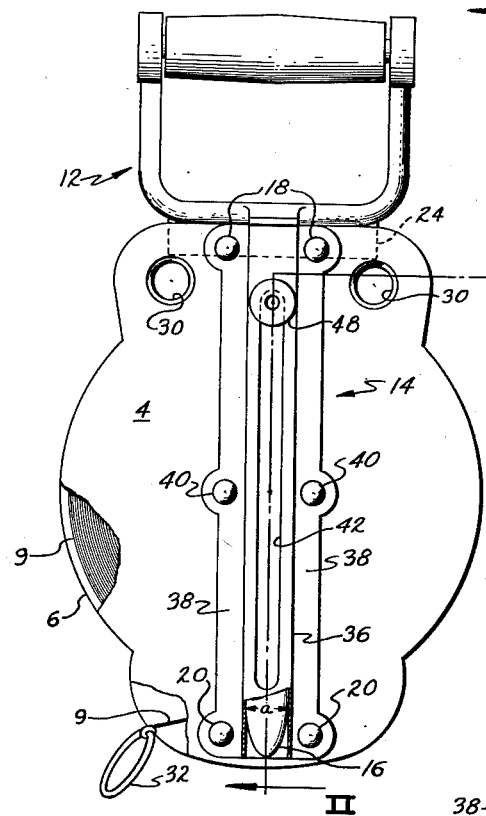
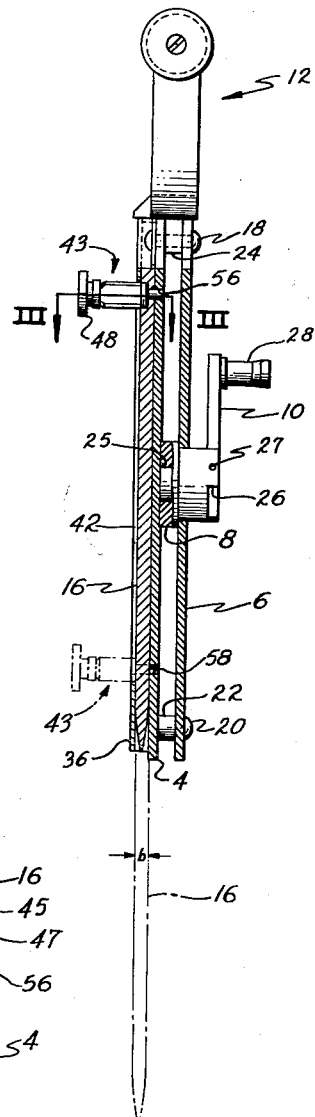
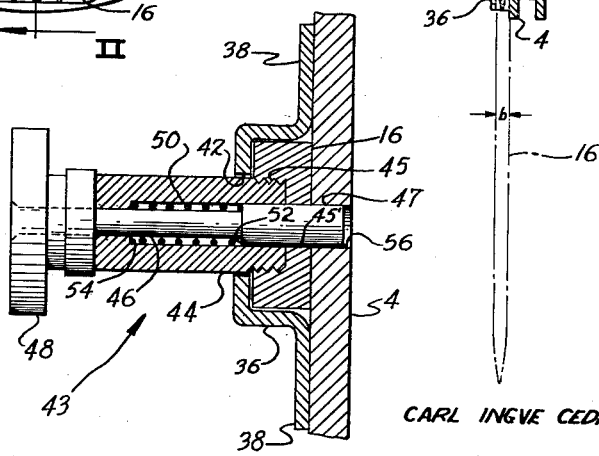
INVENTOR
CARL INGVE CEDERHOLM
BY Chapin & Neal
ATTORNEYS United States Patent Office 3,045,788
Patented July 24, 1962

3,045,788
BAYONET REEL
Carl Ingve Cederholm, P.O. Box 236, Bastrop, Tex.
Filed Feb. 10, 1959, Ser. No. 792,331
1 Claim. (Cl. 189—90)

This invention relates to hand reels and more particularly to reels for tape measures and the like having means for supporting the reel in a fixed position relative to the ground.

It is the primary object of this invention to provide an improved hand reel for measuring tapes and the like including a retractable blade member for supporting the reel at a fixed location on the ground and which does not add substantially to the overall bulk of the reel particularly when the blade is in its retracted position.

The above and other objects and advantages of this invention will be more readily apparent from a reading of the following description of which the following drawings are a part.

FIG. 1 is a front elevation of a tape reel embodying the present invention and with parts cut away;

FIG. 2 is a section of the reel shown in FIG. 1 taken along line II—II and with the measuring tape removed;

FIG. 3 is a section taken along line III—III of FIG. 2 and on an enlarged scale.

Referring now in detail to the figures, a hand reel shown in FIGS. 1 and 2 and embodying the present invention, comprises a body portion including side plates 4 and 6, a tape receiving spool 8 on which a measuring tape 9 is coiled and a crank arm 10 for rotating the spool 8 to reel in the tape. A handle 12 extends from the top of the reel body and a reel supporting means, indicated generally at 14, is disposed on the side plate 4 and includes a movable blade 16 shown in its retracted position in FIG. 1.

The side plates 4 and 6 of the illustrated reel are generally of flat construction and are secured in spaced opposing relation by means of rivets 18 and 20 which extend through spacers 22 at the lower end of the reel and a shank portion 24 of the handle 12 which is captured between the upper portions of the plates 4 and 6. The spacers 22 and the shank portion 24 of the handle are designed to provide sufficient space between the side plates to allow for easy reeling and unreeling of the tape 9 on the spool 8 and between the side plates. The spool 8 is journaled in the plate 6 and on a stud 25 which extends from the plate 4. The spool extends outwardly through the plate 6 and is slotted as at 26 for receiving the inner end of a crank arm 10 which is pivotally connected to the spool by a pivot pin 27. A knob 28 extends outwardly from the arm 10 and by pivoting the arm 10 through an angle of 180°, the knob 28 may be inserted into one of two holes 30 which extend through the side plates 4 and 6, for locking the spool 8 in a given position. The insertion of the handle 28 into one of the holes 30 prevents unreeling of the tape 9 from the spool since the inner end of the tape is secured to the spool in conventional fashion either directly or by means of a spiral spring member. The outer end of the tape 9 is provided with an eyelet 32 for receiving a stake pin used in measuring land. The stake pin, which is not shown, may be any of the well-known types and for a one man measuring job would preferably be of the self ejection type which may be ejected from the ground from a location remote from the pin by merely tugging on the measuring tape.

The supporting means 14 of the reel includes the blade 16 and a guideway for slidably receiving the blade, the guideway being in the form of an elongated strip having a U-shaped channel portion 36 best seen in FIG. 3 and outwardly extending flange portions 38 by which the strip is secured to the plate 4. The rivets 18 and 20, in addition to holding the plates 4 and 6 in position, extend through the flange portion of the strip and with additional rivets 40 securely hold the strip in place on the plate 4. The outer and sidewall portions of the channel 36 and the underlying portion of the plate 4 form a sheath for slidingly receiving the blade 16. The sheath and the blade 16 are both generally rectangular in cross section, the sheath being of sufficient size for easy sliding movement of the blade 16 therein. The blade 16 is in the form of a flat bayonet having a relatively large width $a$ as compared with its thickness $b$ (FIG. 2) and a length which is less than the length of the reel body. The bayonet is disposed generally parallel and contiguous with the plate 4. The upper wall portion of the channel strip includes a lengthwise slot 42 which terminates short of the upper and lower ends of the strip. An operating knob 43 for vertically sliding the blade in the channel 36 and locking it in a selected position extends outwardly from the outer face of the bayonet 16 and through the slot 42. The operating knob includes a tubular sleeve 44 (FIG. 3) which is threaded into the bayonet adjacent its upper end as at 45. A hole 45' extends through the bayonet and communicates with the bore through the tubular member 44. A pin 46 is axially disposed within the bore of the sleeve 44 and includes an inner portion 47, a central portion of reduced diameter and a head 48 on its outer end. A compression spring 50 is disposed coaxially about the central portion of the pin 46 and is seated at one end on a shoulder 52 of the pin and at the other end on a shoulder portion 54 of the tubular sleeve 44. The plate 4 is provided with an opening 56 adjacent the upper terminal end of the slot 42 and another opening 58 adjacent the lower end of the slot 42. The openings 56 and 58 are disposed to register with the hole 45' through the bayonet and are of sufficient size to receive the inner end 47 of the spring loaded pin 46. The opening 56 is disposed at a distance above the lower peripheral portion of the plates 4 and 6 which is greater than the length of the bayonet below the knob 43. Thus, when the bayonet is moved to its retracted position as shown in FIG. 2, the pin 46 is carried by the bayonet and forced by the spring 50 into the hole 56 locking the bayonet in its retracted position in which the bayonet is disposed wholly within the periphery of the plate 4. To move the blade 16 to its projecting position which is shown by dotted lines in FIG. 2, the pin 46 is pulled outward by its head 48 sufficiently to withdraw the inner end 47 of the pin from the hole 56. The bayonet may then be slid to its lower or projecting position in which the pin 46 is forced into the hole 58 by the spring 50. The upper and lower terminal ends of the slot 42 are adapted to engage the knob 43 determining the extent of travel of the blade 16 and also preventing its inadvertent removal from the sheath. With the bayonet in its projecting position, it may be readily seen that the reel may be supported in a fixed position relative to the ground by forcing the bayonet into the ground.

The flat construction of the bayonet provides a reel having a compact support unit which is disposed wholly within the periphery of the reel body when the bayonet is in its retracted position adding only slightly to the thickness and overall bulk of the reel. In addition this flat bayonet construction is instrumental in retaining the reel in a fixed angular position relative to the line of measurement and overcomes the tendency of the reel to be rotated about its vertical axis by small torque forces.

Having thus described this invention, what is claimed is:
In a measuring tape reel having a body portion including spaced parallel side plates, ground support means comprising a downwardly opening sheath disposed on the outer surface of one of said side plates, said sheath including an outer wall portion disposed in spaced opposed relation to a surface portion of the plate on which it is disposed, a flat bayonet telescopically slidably carried within said sheath parallel to said plates, and means carried by said bayonet engageable with the opposed surface portion of said one side plate for releasably locking said bayonet in a position projecting outwardly of the periphery of said side plates and in a retracted position in which said bayonet is disposed within said sheath and the periphery of said side plates.

References Cited in the file of this patent

UNITED STATES PATENTS

| | | |
|---|---|---|
| 470,777 | Billings | Mar. 15, 1892 |
| 1,359,519 | Moore | Nov. 23, 1920 |
| 1,423,516 | Dieckmann | July 25, 1922 |
| 1,456,786 | De Luca | May 29, 1923 |
| 1,631,513 | Berry | June 7, 1927 |
| 2,070,254 | Burgner | Feb. 9, 1937 |